US007755033B2

(12) United States Patent
Kamimura et al.

(10) Patent No.: US 7,755,033 B2
(45) Date of Patent: Jul. 13, 2010

(54) METHOD FOR ANALYZING MINUTE AMOUNTS OF PD, RH AND RU, AND HIGH FREQUENCY PLASMA MASS SPECTROSCOPE USED FOR SAME

(75) Inventors: Kenichi Kamimura, Hitachi (JP); Satoshi Kawada, Tokyo (JP); Kouji Tsuchiya, Tokyo (JP)

(73) Assignee: Nippon Mining & Metals Co., Ltd., Tokyo (JP)

( * ) Notice: Subject to any disclaimer, the term of this patent is extended or adjusted under 35 U.S.C. 154(b) by 325 days.

(21) Appl. No.: 12/068,860

(22) Filed: Feb. 12, 2008

(65) Prior Publication Data

US 2008/0230690 A1 Sep. 25, 2008

(30) Foreign Application Priority Data

Mar. 20, 2007 (JP) ............................ 2007-072442

(51) Int. Cl.
*B01D 59/44* (2006.01)

(52) U.S. Cl. ...................................... 250/282; 250/281

(58) Field of Classification Search ....................... None
See application file for complete search history.

(56) References Cited

FOREIGN PATENT DOCUMENTS

JP 9-129174 A 5/1997

OTHER PUBLICATIONS

Japanese Office Action, 2007-072442, Apr. 11, 2009, pp. 1-3.
Ian Jarvis et al., "Determination of the platinum-group elements in geological materials by ICP-MS using microwave digestion, alkali fusion and cation-exchange chromatography," Chemical Geology, 143, (1997), pp. 27-42.

*Primary Examiner*—David A Vanore
(74) *Attorney, Agent, or Firm*—Birch, Stewart, Kolasch & Birch, LLP

(57) ABSTRACT

The invention provides a method for analyzing minute amounts of Pd, Rh and Ru with high accuracy by a high-frequency plasma mass spectroscope. The method comprises (1) a step of pretreating a sample by an alkali fusion method using a sodium compound; and (2) a step of analyzing the pretreated sample using a high-frequency plasma mass spectroscope; wherein, in step (2), the distance between a sampling cone and a skimmer cone is adjusted such that the concentration of $^{40}Ar^{65}Cu$ which interferes with Pd, the concentrations of $^{40}Ar^{63}Cu$ and $^{40}Ar^{40}Ar^{23}Na$ which interfere with Rh, and the concentrations of $^{38}Ar^{63}Cu$ and $^{40}Ar^{38}Ar^{23}Na$ which interfere with Ru are all equal to or less than 0.05 ppb.

12 Claims, 1 Drawing Sheet sample to crucible

← flux (sodium compounds mixture)

melting gas burner or electric furnace leaching

← $H_2O$

← ethanol

← HCl heating

← Lu solution (reference element)

measuring volume to analyzer

METHOD FOR ANALYZING MINUTE AMOUNTS OF PD, RH AND RU, AND HIGH FREQUENCY PLASMA MASS SPECTROSCOPE USED FOR SAME

FIELD OF THE INVENTION

The present invention relates to a method for analyzing minute amounts of Pd, Rh and Ru using a high-frequency plasma mass spectroscope. In particular, the invention relates to a method for analyzing minute amounts of Pd, Rh and Ru contained in a sample, which is pretreated with an alkali fusion method using a sodium compound, using a high-frequency plasma mass spectroscope.

BACKGROUND OF THE INVENTION

There is a growing need for technical development to recover valuable metals, especially noble metals (Pt, Pd, Rh, Ru and Ir) in the smelting of nonferrous metals such as copper.

To determine the appropriate method for recovering noble metals, it is important to grasp the behaviors of the noble metals in the smelting process. For example, it is important to examine the mass balance of noble metals from a flash furnace to an electrolytic bath. However, such grasping of the behavior has been difficult so far since their amounts are often very low, i.e., equal to or less than the order of μg/g.

Therefore, there is a need for a method for analyzing noble metals with high sensitivity. To attain the object, an analysis method having the determination limit in the order of 0.01 g/t (0.01 μg/g) is required.

Conventionally, a dry assaying method or nickel mat method has been used for the analysis of noble metals. These methods are excellent at decomposition of a large amount of sample, concentration and separation from other components, and sensitivity, and have been used for the analysis of minute amounts of gold, platinum and palladium contained in mineral raw materials. However, these methods don't satisfy the aforementioned determination limit level, therefore there has been a need for a different analysis method.

A high-frequency plasma mass spectroscope using inductively coupled plasma (ICP) or microwave induced plasma (MIP) has been known as an apparatus for analyzing minute amounts of elements with high sensitivity. A high-frequency plasma mass spectroscope analyzes isotopes or elements by ionizing target elements contained in a dissolved sample with high-frequency plasma, feeding the generated ions to a mass spectrometer, and counting the number of ions in mass/charge number (m/z) of the target elements.

A high-frequency plasma mass spectroscope primarily comprises an ionizing section equipped with a plasma torch for ionizing target elements with high-frequency plasma, an interface section equipped with a sampling cone and a skimmer cone which are differentially pumped to feed the ions generated in the HFP at atmospheric pressure to a mass analysis section under a high vacuum condition, and the mass analysis section for mass analysis of the generated ions.

Conventionally, it is known that the optimal distance between the sampling cone and the skimmer cone, at which the highest sensitivity to the target ions is observed, varies over time due to the deterioration of those components. In addition, it is also known that depending on the distance between the sampling cone and the skimmer cone, the target ions are oxidized, thereby complicating the mass spectrum and causing analysis errors. Japanese unexamined patent publication No. 9-129174 discloses a high-frequency plasma mass spectroscope comprising a means for changing the distance between a sampling cone and a skimmer cone. This patent publication states that it can automatically determine the position where the highest sensitivity can be obtained for the ions of a target element. In addition, it can also automatically determine the position where the generation of oxides is suppressed by successively changing the distance between the sampling cone and the skimmer cone while monitoring the ionic strengths for both the target element and its oxide.

Problems to be Solved by the Invention

However, there has arisen a problem that when a copper concentrate (reference material) in which minute known amounts of Pd, Rh and Ru are contained was analyzed by a high-frequency plasma mass spectroscope, the measured concentrations were different from the certified values by the order of several-fold even though the distance between the sampling cone and the skimmer cone was established such that the highest sensitivity is observed to each element. In addition, it has been found that this error was not caused by the effect of oxides.

Accordingly, the object of the invention is to provide a method for analyzing minute amounts of Pd, Rh and Ru with high accuracy using a high-frequency plasma mass spectroscope.

Means for Solving the Problem

Various spectral interferences caused by plasma forming argon, the main component of a sample, or a solvent used for decomposition are observed when elementary analysis is performed with a high-frequency plasma mass spectroscope. After diligent study, the inventors have found out that the measurement error becomes prominent when the concentrations of Pd, Rh and Ru are equal to or less than 100 mass ppm. In particular, we have found out that spectral interference caused by $^{40}Ar^{65}Cu$ ion is prominent for Pd, spectral interferences caused by $^{40}Ar^{63}Cu$ and $^{40}Ar^{40}Ar^{23}Na$ ions are prominent for Rh, and spectral interferences caused by $^{38}Ar^{63}Cu$ and $^{40}Ar^{38}Ar^{23}Na$ ions are prominent for Ru, and they are the major reasons for the measurement errors.

$^{38}Ar^{63}Cu$, $^{40}Ar^{65}Cu$ and $^{40}Ar^{63}Cu$ are thought to result from Ar used as a plasma gas or carrier gas, and Cu contained in the sample. $^{40}Ar^{38}Ar^{23}Na$ and $^{40}Ar^{40}Ar^{23}Na$ are thought to result from Ar used as a plasma gas or carrier gas, and sodium compounds used to dissolve poorly soluble Rh and Ru.

Furthermore, we have found out that the extent of the spectral interference caused by these disturbing ions is significantly affected by the distance between a sampling cone and a skimmer cone, and it is possible to extremely reduce the spectral interference by adjusting the distance between the sampling cone and the skimmer cone to a specific value, thereby enabling to analyze minute amounts of Pd, Rh and Ru with high accuracy. In addition, we have also found out that the distances between the sampling cone and the skimmer cone for effectively reducing the spectral interferences caused by those three types of ions are coincidentally almost identical with each other.

The present invention has been made based on these findings, and in one aspect, is a method for analyzing minute amounts of Pd, Rh and Ru as target elements comprising:

(1) a step of pretreating a sample by an alkali fusion method using a sodium compound; and (2) a step of analyzing the pretreated sample using a high-frequency plasma mass spectroscope;

wherein, in step (2), the distance between a sampling cone and a skimmer cone is adjusted such that the concentration of $^{40}Ar^{65}Cu$ which interferes with Pd, the concentrations of $^{40}Ar^{63}Cu$ and $^{40}Ar^{40}Ar^{23}Na$ which interfere with Rh, and the concentrations of $^{38}Ar^{63}Cu$ and $^{40}Ar^{38}Ar^{23}Na$ which interfere with Ru are all equal to or less than 0.05 ppb.

In one embodiment of the analysis method of the invention, the concentration of each target element in the sample is equal to or less than 100 mass ppm.

In another embodiment of the analysis method of the invention, the concentration of each target element in the sample is equal to or less than 1 mass ppm.

In another embodiment of the analysis method of the invention, Cu concentration in the sample is 0 to 80 mass %.

In another embodiment of the analysis method of the invention, Na concentration of a pretreated sample is 500 to 5000 mass ppm.

In another embodiment of the analysis method of the invention, the distance between the sampling cone and the skimmer cone is 3 to 7 mm.

In another embodiment of the analysis method of the invention, the method uses a high-frequency plasma mass spectroscope equipped with a means for changing the distance between the sampling cone and the skimmer cone.

In another embodiment of the analysis method of the invention, the high-frequency plasma mass spectroscope is an ICP mass spectroscope.

In another aspect, the invention is a high-frequency plasma mass spectroscope for use in the method stated in item (1), comprising a means for changing the distance between a sampling cone and a skimmer cone.

In one embodiment of the high-frequency plasma mass spectroscope of the invention, the means for changing the distance between the sampling cone and the skimmer cone is a metallic spacer arranged between the sampling cone and the skimmer cone.

In another embodiment of the high-frequency plasma mass spectroscope of the invention, the distance between the sampling cone and the skimmer cone is 3 to 7 mm.

In another embodiment of the high-frequency plasma mass spectroscope of the invention, the high-frequency plasma mass spectroscope is an ICP mass spectroscope.

Advantageous Effect of the Invention

The present invention enables to analyze minute amounts of Pd, Rh and Ru by a high-frequency plasma mass spectroscope with high accuracy when a sample contains Cu. For example, it enables to analyze the amount of noble metals contained in intermediate products in copper smelting process such as a copper concentrate, copper slug, and copper mat using the same apparatus with high accuracy. In addition, it also eliminates the need for the complicated concentration and separation from other components, enabling speedy measurement.

BEST MODE FOR CARRYING OUT THE INVENTION

Target Samples

Figures 1, 2:
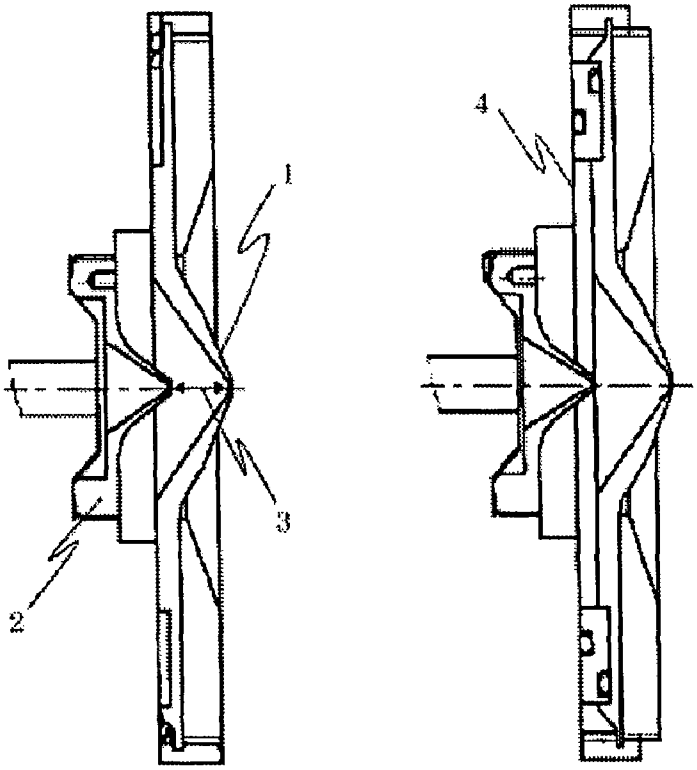
FIG. 1 shows exemplary pretreatment of a sample by an alkali fusion method.
FIG. 2 is a schematic cross-section of the interface section of a high-frequency plasma mass spectroscope.

There is no particular restriction on the target sample for analysis in the invention given that the sample contains Pd, Rh or Ru. However, the effect of reducing spectral interferences caused by $^{38}Ar^{63}Cu$, $^{40}Ar^{65}Cu$, $^{40}Ar^{63}Cu$, $^{40}Ar^{38}Ar^{23}Na$ and $^{40}Ar^{40}Ar^{23}Na$ becomes more prominent when the amount of Cu contained in the sample is 0 to 80 mass %., preferably 0 to 40 mass %., and more preferably 1 to 40 mass %. Furthermore, the effect of reducing spectral interference becomes larger when the amount of a target element, i.e., Pd, Rh or Ru is 100 mass ppm or less, preferably 1 mass ppm or less, and typically 0 to 100 mass ppm.

Accordingly, in one preferable embodiment of the analysis method of the invention, the amount of Cu contained in a sample is 0 to 80 mass %., preferably 0 to 40 mass %., and more preferably 1 to 40 mass %. Furthermore, in another preferable embodiment, the amount of a target element is 100 mass ppm or less, preferably 1 mass ppm or less, and typically 0 to 100 mass ppm. In accordance with the invention, the lower measuring limit for these target elements can be 0.01 to 0.05 g/t (0.01 to 0.05 μg/g).

The examples of sample satisfying these concentration conditions include intermediate products in copper smelting process such as a copper concentrate, copper slug and copper mat, dusts, automobile disposable catalysts, noble metal scraps, and intermediate materials in these recovering processes.

Pretreatment

In order to feed samples into a high-frequency plasma mass spectroscope, it is at least necessary to dissolve target elements. However, among the target elements (Pd, Rh or Ru), Rh and Ru have poor solubility, and are hardly dissolved in mineral acids. Therefore, they are dissolved by an alkali fusion method using a sodium compound such as sodium hydroxide, sodium nitrate, sodium peroxide or sodium carbonate. Although this method is commonly practiced, and thus there is no need for explanation, an example of the pretreatment by the alkali fusion method is illustrated in FIG. 1. Firstly, a flux (mixed sodium compounds) is mixed in a sample in a metallic crucible, and the mixture-containing crucible is heated by a gas burner or electric furnace to melt Pd, Rh and Ru contained in the sample. Then, the melted material is heated and dissolved after adding water, ethanol and hydrochloric acid. Finally, a Lu solution is added as a reference element and the volume is measured. Typically, the obtained solution contains Na in the order of 500 to 5000 mass ppm.

High-Frequency Plasma Mass Spectroscope

The pretreated sample is analyzed by a high-frequency plasma mass spectroscope in conformity with JIS KO133 standards. The high-frequency plasma mass spectroscope may be either an inductively coupled plasma (ICP) mass spectroscope or microwave induced plasma (MIP) mass spectroscope. The settings of the apparatus other than the distance between the sampling cone and the skimmer cone may be configured in accordance with a manual of the commercially available high-frequency plasma mass spectroscope.

In the high-frequency plasma mass spectroscope, the distance between the sampling cone and the skimmer cone, which are arranged in the interface section, may be fixed. However, when it is fixed, the set of a sampling cone and a skimmer cone needs to be replaced to change the distance.

Therefore, it is preferable to use an apparatus capable of varying the distance. In the invention, the term "difference between a sampling cone and a skimmer cone" means the distance between the tips of both cones. The examples of the distance-varying means include, but not limited to, changing the thickness of a metallic O-ring spacer, stacking a number of spacers, and using some sort of automatic moving mechanism to move the sampling cone back and forth.

In a preferable embodiment, the distance is varied by changing the position of a sampling cone while keeping a skimmer cone at a fixed position for the reason of matrix effect and sensitivity decrease caused by the change of the ion drawing condition. FIG. 2 shows a schematic view of an interface section. The illustrated embodiment employs a distance-varying means in which the distance is varied by changing the thickness of a metallic gasket made of copper. The left side shows one state in which it doesn't use the metallic gasket, and the right side shows another state in which it uses the metallic gasket.

The distance between the sampling cone and the skimmer cone has a prominent effect on the extent of spectral interferences caused by $^{38}Ar^{63}Cu$, $^{40}Ar^{65}Cu$, $^{40}Ar^{63}Cu$ or $^{40}Ar^{38}Ar^{23}Na$, and $^{40}Ar^{40}Ar^{23}Na$. The position of the skimmer cone at which the concentration of $^{40}Ar^{65}Cu$ which interferes with Pd, the concentrations of $^{40}Ar^{63}Cu$ and $^{40}Ar^{40}Ar^{23}Na$ which interfere with Rh, and the concentrations of $^{38}Ar^{63}Cu$ and $^{40}Ar^{38}Ar^{23}Na$ which interfere with Ru all become 0.05 ppb or less, preferably 0.01 ppb or less, and more preferably 0.005 ppb or less can be found by successively changing the distance between the sampling cone and the skimmer cone provided that the conditions of the apparatus other than the distance between the sampling cone and the skimmer cone is optimized by a conventional means as stated in the manual of the apparatus or well-known technology. In the invention, the term "ppb" means μg/L. It becomes possible to quantitatively analyze minute amounts of Pd, Rh or Ru contained in a sample by establishing the distance between the sampling cone and the skimmer cone such that these ionic strength ratios are satisfied. This is because the distances between the sampling cone and the skimmer cone for effectively reducing the spectral interferences caused by these disturbing ions are almost identical with each other.

The analyzing system may be built such that an optimal distance is automatically established for the sake of convenience. An apparatus disclosed in Japanese unexamined patent publication No. H09-129174 may be used as a reference for the automation. For example, an apparatus may comprise a means for monitoring the ion strength of Pd, i.e., a target element contained in a sample and the ion strength of $^{40}Ar^{65}$ Cu, a calculation means for calculating the ratio of the ion strength of $^{40}Ar^{65}Cu$ to the ion strength of Pd, a means for varying the distance between a sampling cone and a skimmer cone, and a means for driving said distance-varying means such that said ratio becomes minimum. Parameters necessary to make the distance between the sampling cone and the skimmer cone converge to a certain value, such as a type of ion strength to be monitored, numerical values to be calculated, and conditions under which the distance-varying means is driven may be adjusted as appropriate.

Though depending on the type of a high-frequency plasma mass spectroscope, the effect of reducing spectral interferences caused by $^{38}Ar^{63}Cu$, $^{40}Ar^{65}Cu$, $^{40}Ar^{63}Cu$, $^{40}Ar^{38}Ar^{23}Na$ and $^{40}Ar^{40}Ar^{23}Na$ becomes large when the distance between the sampling cone and the skimmer cone is generally 2 to 7 mm, preferably 4 to 6 mm.

EXAMPLES

Examples in accordance with the invention will be explained hereinafter for the better understanding of the invention and advantages thereof. However, the invention is not limited to the examples.

Example 1

Copper standard solution was added to an analytical blank liquid which was pretreated in accordance with the method illustrated in FIG. 1, and the resulting solution was used as a sample. In this example, a mixture of sodium peroxide and sodium carbonate was used as sodium compounds. The Na concentration in the sample was 2500 mass ppm. Then, analysis was performed with an ICP mass spectroscope (Model SPQ9400 from SII NanoTechnology Inc.). During the analysis, change in the effect of spectral interference caused by each of $^{40}Ar^{65}Cu$, $^{40}Ar^{63}Cu$, $^{38}Ar^{63}Cu$, $^{40}Ar^{40}Ar^{23}Na$ and $^{40}Ar^{38}Ar^{23}Na$ was examined as the distance between the sampling cone and the skimmer cone was successively changed. The distance was changed by changing the thickness of a metallic gasket made of copper. During the process, the position of the sampling cone was changed while keeping the skimmer cone at a fixed position. Tables 1 and 2 show the results. As can be seen from the tables, it is possible to reduce or restrain the spectral interferences by changing the distance (d) between the sampling cone and the skimmer cone. For example, it is apparent that all of $^{40}Ar^{65}Cu$ (Pd), $^{40}Ar^{63}Cu$ (Rh), $Ar^{63}Cu$ (Ru), $^{40}Ar^{40}Ar^{23}$ Na (Rh) and $^{40}Ar^{38}Ar^{23}Na$ (Ru) could be reduced to 0.05 ppb or less by adjusting the distance to 6.5 mm. Copper concentrations 5 ppm, 25 ppm, 50 ppm and 100 ppm in Table 1 are equivalent to 0.04 mass %., 10 mass %., 20 mass %. and 40 mass %. respectively when converted into the amounts of copper contained in the sample. Considering that copper concentration in an intermediate product in copper smelting process such as a copper concentrate, copper slug, and copper mat is typically in the order of 10% or less, it is apparent that the invention is effective in reducing spectral interference especially when such amount of copper is contained in a sample.

TABLE 1

| copper conc. ppm | Distance (d) (mm) | $^{33}Ar^{63}Cu(^{101}Ru)$ ppb | $^{40}Ar^{63}Cu(^{103}Rh)$ ppb | $^{40}Ar^{63}Cu(^{105}Pd)$ ppb |
|---|---|---|---|---|
| 5 | 3.0 | 0.001 | 0.063 | 0.025 |
| 5 | 4.0 | <0.001 | 0.005 | 0.003 |
| 5 | 6.0 | <0.001 | 0.001 | 0.001 |
| 5 | 6.5 | <0.001 | <0.001 | 0.001 |
| 25 | 3.0 | 0.002 | 0.26 | 0.058 |
| 25 | 4.0 | <0.001 | 0.018 | 0.011 |
| 25 | 6.0 | <0.001 | 0.008 | 0.003 |
| 25 | 6.5 | <0.001 | 0.002 | 0.001 |
| 50 | 3.0 | 0.006 | 0.56 | 0.14 |
| 50 | 4.0 | <0.001 | 0.041 | 0.021 |
| 50 | 6.0 | <0.001 | 0.022 | 0.007 |
| 50 | 6.5 | <0.001 | 0.009 | 0.003 |
| 100 | 3.0 | 0.012 | 1.3 | 0.32 |
| 100 | 4.0 | <0.001 | 0.087 | 0.041 |
| 100 | 6.0 | <0.001 | 0.039 | 0.011 |
| 100 | 6.5 | <0.001 | 0.014 | 0.008 |

TABLE 2

| Distance (d) (mm) | $^{40}Ar^{40}Ar^{23}Na$ ($^{103}Rh$) ppb | $^{40}Ar^{38}Ar^{23}Na$ ($^{101}Ru$) ppb |
|---|---|---|
| 3.0 | 1.0 | 0.17 |
| 4.0 | 0.014 | 0.007 |
| 6.0 | 0.003 | 0.001 |
| 6.5 | 0.007 | 0.004 |

Example 2

A copper concentrate containing known quantities of palladium, rhodium and ruthenium (reference material CRM1701-86: Cu content of 23.6 mass %.) was pretreated in accordance with the method illustrated in FIG. 1. These elements were analyzed using an ICP mass spectroscope (Model SPQ9400 from SII NanoTechnology Inc.). During the analysis, the distance between the sampling cone and the skimmer cone was adjusted to 6.5 mm at which it had been effective in reducing spectral interferences in Example 1, and to a typical value of 3.0 mm at which it had been not effective in Example 1. As can be seen from Table 3, the measured concentrations of palladium, rhodium and ruthenium showed excellent consistency with the certified values when the distance between the sampling cone and the skimmer cone was adjusted to the aforementioned value for reducing spectral interference. The result illustrated that the present invention enabled high accuracy analysis.

TABLE 3

| Distance between samp. cone and skim. cone (mm) | target components for analysis (mass ppm) | | |
|---|---|---|---|
| | ruthenium | rhodium | palladium |
| 3.0 | 0.44 | 1.2 | 43 |
| 6.5 | 0.12 | 0.28 | 38 |
| certified value | 0.12 ± 0.01 | 0.27 ± 0.02 | 38.0 ± 4.2 |

What is claimed is:

1. A method for analyzing minute amounts of Pd, Rh and Ru as target elements comprising:

(1) a step of pretreating a sample by an alkali fusion method using a sodium compound; and (2) a step of analyzing the pretreated sample using a high-frequency plasma mass spectroscope;

wherein, in step (2), the distance between a sampling cone and a skimmer cone is adjusted such that the concentration of $^{40}Ar^{65}Cu$ which interferes with Pd, the concentrations of $^{40}Ar^{63}Cu$ and $^{40}Ar^{40}Ar^{23}Na$ which interfere with Rh, and the concentrations of $^{38}Ar^{63}Cu$ and $^{40}Ar^{38}Ar^{23}Na$ which interfere with Ru are all equal to or less than 0.05 ppb.

2. The method according to claim 1, wherein the concentration of each target element in the sample is equal to or less than 100 mass ppm.

3. The method according to claim 2, wherein the concentration of each target element contained in the sample is equal to or less than 1 mass ppm.

4. The method according to any one of claims 1-3, wherein Cu concentration in the sample is 0 to 80 mass %.

5. The method according to claim 1, wherein Na concentration in the pretreated sample is 500 to 5000 mass ppm.

6. The method according to claim 1, wherein the distance between the sampling cone and the skimmer cone is 3 to 7 mm.

7. The method according to claim 1, wherein the high-frequency plasma mass spectroscope is equipped with a means for changing the distance between the sampling cone and the skimmer cone.

8. The method according to claim 1, wherein the high-frequency plasma mass spectroscope is an ICP mass spectroscope.

9. A high-frequency plasma mass spectroscope for use in the method according to claim 1, comprising a means for changing the distance between the sampling cone and the skimmer cone.

10. The high-frequency plasma mass spectroscope according to claim 9, wherein the means for changing the distance between the sampling cone and the skimmer cone is a metallic spacer arranged between the sampling cone and the skimmer cone.

11. The high-frequency plasma mass spectroscope according to claim 9 or 10, wherein the distance between the sampling cone and the skimmer cone is 3 to 7 mm.

12. The high-frequency plasma mass spectroscope according to claim 9, wherein the high-frequency plasma mass spectroscope is an ICP mass spectroscope.

* * * * *